United States Patent [19]
Kelm et al.

[11] Patent Number: 5,135,339
[45] Date of Patent: Aug. 4, 1992

[54] BROACHING TOOL

[75] Inventors: Walter H. Kelm, Mt. Clemens; William J. Cleland, Warren, both of Mich.

[73] Assignee: Carboloy Inc., Warren, Mich.

[21] Appl. No.: 647,066

[22] Filed: Jan. 29, 1991

[51] Int. Cl.$^5$ .............................................. B23D 41/04
[52] U.S. Cl. ......................................... 409/287; 407/17
[58] Field of Search ............... 409/247, 260, 244, 287; 407/15, 16, 17, 18, 19, 13

[56] References Cited

U.S. PATENT DOCUMENTS

| | | | |
|---|---|---|---|
| 2,204,537 | 6/1940 | LaPointe et al. | 407/17 |
| 2,585,166 | 2/1952 | Phaneuf | 407/17 X |
| 2,585,832 | 2/1952 | Phaneuf | 407/17 |
| 2,697,271 | 12/1954 | Phaneuf | 407/17 |
| 3,656,220 | 4/1972 | Dupuis | 407/17 |
| 3,662,443 | 5/1972 | Schmidt | 407/17 |
| 3,707,748 | 1/1973 | Price et al. | 407/17 |
| 4,243,347 | 1/1981 | Clapp et al. | 407/15 |
| 4,740,115 | 4/1988 | Hertel et al. | 409/260 |
| 4,801,226 | 1/1989 | Gleason | 409/244 |
| 4,993,889 | 2/1991 | Kelm | 407/15 |

FOREIGN PATENT DOCUMENTS

| | | | |
|---|---|---|---|
| 17288 | 2/1977 | Japan | 407/18 |
| 119058 | 6/1959 | U.S.S.R. | 407/15 |
| 596387 | 3/1978 | U.S.S.R. | 407/17 |

*Primary Examiner*—William Briggs
*Attorney, Agent, or Firm*—Burns, Doane, Swecker & Mathis

[57] ABSTRACT

A broaching tool includes a holder and a plurality of broaching inserts mounted therein. Spacers are situated between successive pairs of inserts and are formed of a tougher material than the inserts. Each spacer includes a reinforcing web which abuts against a rear surface of its respective leading insert. The reinforcing web extends higher than a lower level of the cutting edge of that respective leading insert, so as to reinforce that insert. The web terminates short of its respective trailing insert, whereby a space is formed between the reinforcing web and the trailing insert for receiving chips formed by the latter.

15 Claims, 2 Drawing Sheets

5,135,339

BROACHING TOOL

BACKGROUND OF THE INVENTION

The present invention is directed to broaching, especially as used for machining finished slots with a single pass, and particularly to a novel broaching tool.

Broaching tools are used for machining metal, such as for forming slots in workpieces like turbine wheels. One such broaching tool is disclosed in Clappe et al U.S. Pat. No. 4,243,347 and another is disclosed in Applicant's copending application Ser. No. 392,260 filed Aug. 10, 1989 U.S. Pat. No. 4,993,889.

The broaching tool comprises a holder and a row of broaching inserts or cutters mounted in the holder. Each insert includes a mounting portion seated within a cavity of a holder, and a cutting portion projecting above the cavity.

During a broaching operation, each slot is cut progressively by sequentially contacting the workpiece with the broaching inserts, i.e., initially with inserts which rough-out the slot, and then with inserts which complete the slot. In particular, the workpiece is sequentially contacted with three different types of inserts, i.e., initially with a series of slotters, then with a series of semi-finishers, and finally with a series of finishers, each series of inserts being mounted in a respective holder. The holders are positioned in end-to-end fashion such that the workpiece is contacted successively by a single pass of the inserts.

The slotters gradually rough-out a slot to a given depth by sequentially removing sections of the slot. The semi-finishers then enter the roughed-out slot and gradually widen the sides of the slot to establish the size and configuration of the slot to a degree approximating the desired final size and shape. The finishers function to remove the last film of material needed to obtain a slot within the desired narrow manufacturing tolerances. In a typical broaching assembly, approximately 60% of the cutting inserts are slotters, 30% are semi-finishers and 10% are finishers.

It is desirable that the finished slots be smooth and precisely configured as possible. It is also desirable that the cutting inserts be long lived, due to the considerable time and expense involved in sharpening and/or replacing the numerous inserts employed in a typical broaching assembly.

During a broaching operation, numerous factors may adversely affect insert behavior in a manner making those goals difficult to achieve. One factor relates to the entry of chips or shavings into a space ahead of each insert. In that regard, it will be appreciated that the chips cut from the workpiece by a given insert will be received in a relatively confined space defined by the front end of the given insert, the rear end of the preceding insert, and the wall of the slot being cut. It is desirable that the space be large enough to permit the chip to curl. Otherwise, the chips may tend to become jammed within the space, producing in the need for the insert to re-cut the chip. This can result in premature chippage and breakage of the cutting edge.

One way of providing sufficient chip space is to reduce the insert thickness in the direction of tool travel, i.e., to terminate the rear end of the cutting portion of each insert short of the front end of the next insert to form a gap therebetween. However, this reduction in the insert thickness weakens the insert and may result in premature failure thereof.

Another way of providing chip space would be to shape the rear end of each insert as a narrow web which extends into contact with the front end of the trailing insert. However, only a very limited amount of chip space can be created by such an expedient.

Some broaching holders are characterized by the provision of individual pockets into which the inserts can be mounted. A portion of the holder located behind each insert would provide reinforcement. However, the number and size of inserts which can be inserted into such a holder is restricted by the number and size of the pockets, in contrast to holders of the type wherein the inserts are mounted in a single longitudinally elongated cavity.

SUMMARY OF THE INVENTION

The present invention relates to a broaching tool which comprises a holder forming therein a cavity which is elongated in a front-to-rear longitudinal direction. A plurality of broaching inserts is arranged in the cavity. Each broaching insert includes a mounting portion removably disposed in the cavity and a cutting portion disposed above the cavity. The cutting portion includes a front surface presenting a cutting edge. Reinforcing spacers are positioned between respective pairs of leading and trailing broaching inserts. Each reinforcing spacer includes a mounting portion removably disposed in the cavity, and a reinforcing portion disposed above the cavity. The mounting portion engages the mounting portions of the respective leading and trailing broaching inserts. The reinforcing portion includes a reinforcing web which extends above a lowermost level of the cutting edge of the respective leading broaching insert. The reinforcing web abuts a rear surface of the respective leading broaching insert to provide reinforcement therefor.

Preferably, the reinforcing web extends rearwardly from the rear surface of the leading broaching insert for a longitudinal distance equal to at least one-third of a longitudinal separation between the leading and trailing broaching inserts. It is also preferable that a maximum width of the reinforcing web, measured in a direction perpendicular to the longitudinal direction, is less than a maximum width of the leading and trailing broaching inserts. It is also preferable that a maximum height of the reinforcing web be less than a maximum height of the respective leading and trailing broaching inserts.

The material of which the spacers are formed is preferably tougher than a material of which the broaching inserts are formed. Preferably, each material is a hard material, such as tungsten carbide.

BRIEF DESCRIPTION OF THE DRAWINGS

The objects and advantages of the invention will become apparent from the following detailed description of a preferred embodiment thereof in connection with the accompanying drawings, in which like numerals designate like elements, and in which.

DETAILED DESCRIPTION OF A PREFERRED EMBODIMENT OF THE INVENTION

Figure 1:
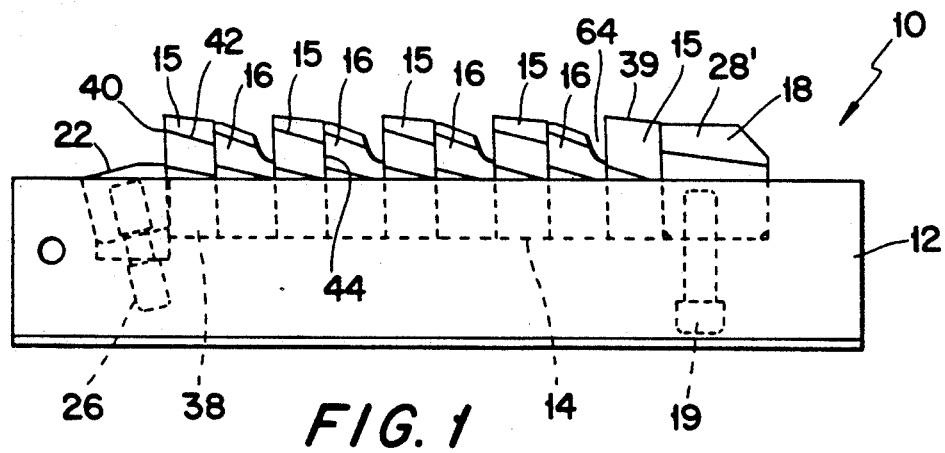
FIG. 1 is a side elevational view of a broaching tool according to the present invention.

Referring to the drawings, a broaching tool 10 according to the present invention includes a holder 12 forming a longitudinally elongated cavity 14 for housing therein a plurality of broaching inserts 15. Any desired number of cutting inserts 15 could be contained within the holder, five inserts being depicted. The inserts 15 are of the finishing type, but slotter or semi-finisher types of inserts could be utilized. Situated between successive ones of the inserts are reinforcing spacers 16 which will be described in greater detail hereinafter.

A rear reinforcing bar 18 is secured by a screw 19 between the rearmost insert 15 and a rear end wall 20 of the cavity 14. A front wedge 22 is positioned between a forwardmost one of the inserts 15 and a front end wall 24 of the cavity. A screw 26 forces the front wedge 22 downwardly to push the assembly of inserts 15 and reinforcing spacers 16 tightly against the rear wall 20.

Side wedges 28 and screws 30 are provided for forcing the inserts and reinforcing spacers against a side wall 32 of the cavity 14 as disclosed in application Ser. No. 392,260 filed Aug. 10, 1989.

Only one broaching tool 10 is depicted. In practice, however, a train of broaching tools 10 would be connected in tandem to sequentially cut a slot in the workpiece in response to relative movement between the workpiece and the broaching assembly.

Figure 2:
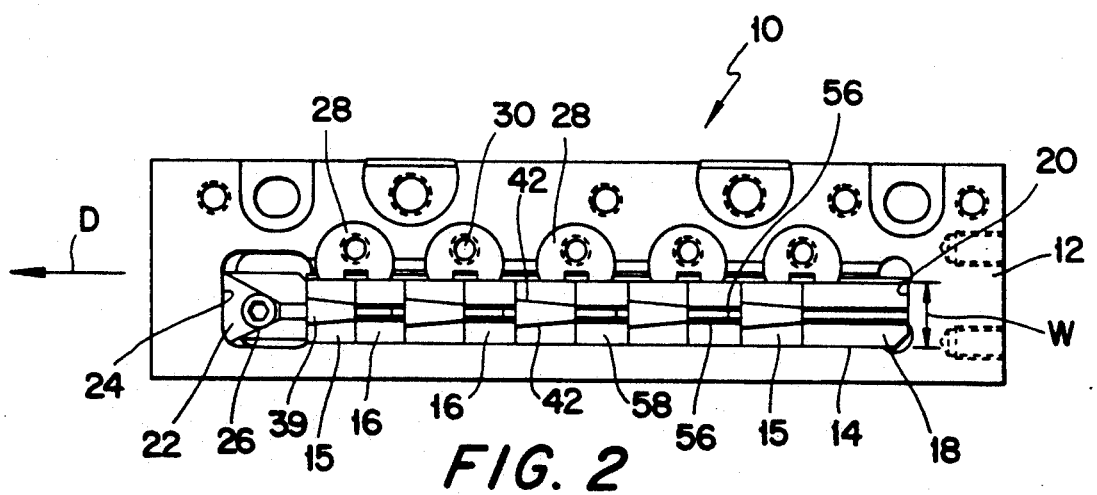
FIG. 2 is a top plan view of the broaching tool depicted in FIG. 1.

Each broaching insert 15 includes a lower mounting portion 38 seated within the cavity 14, and an upper cutting portion 39 projecting out of the cavity 14. The cutting portion 39 includes a front cutting edge 40 and side surfaces 42 which are rearwardly convergent (see FIG. 2) to form a relief relative to the longitudinal direction of movement D and thereby prevent rubbing of the surfaces 42 against the sides of the slot being cut in the workpiece. The side surfaces 42 terminate at a flat rear surface 44 of the insert (see FIG. 6).

The broaching inserts and reinforcing spacers are formed of hard, wear-resistant materials, such as tungsten carbide for example. The reinforcing spacers are preferably formed of a tougher material than the inserts, i.e., a less brittle material having a greater modulus of elasticity which is less susceptible to fracture than the broaching inserts. Thus, in that case the material of the broaching inserts would be ideal for cutting, and the material of the reinforcing spacers would be ideal for reinforcement.

Figures 3, 4:
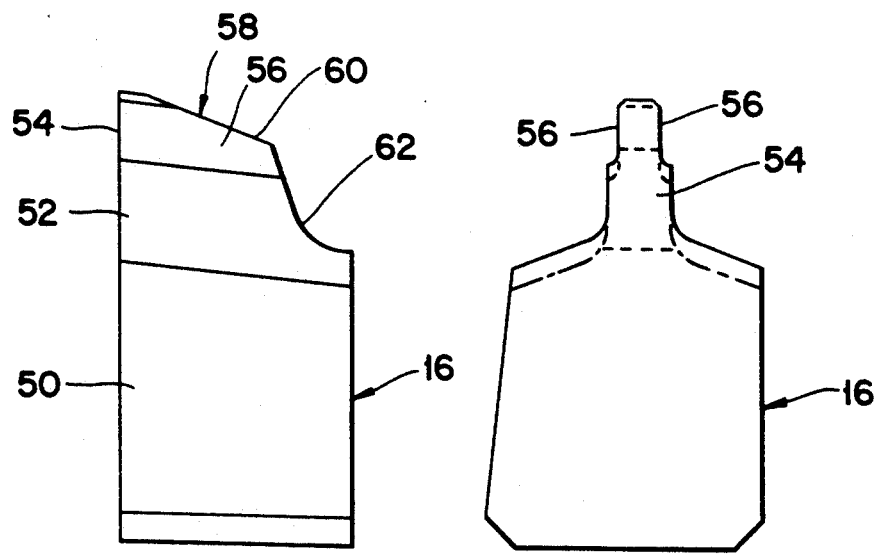
FIG. 3 is a side elevational view of a spacer according to the present invention.
FIG. 4 is a front elevational view of the spacer depicted in FIG. 3.
Figure 6:
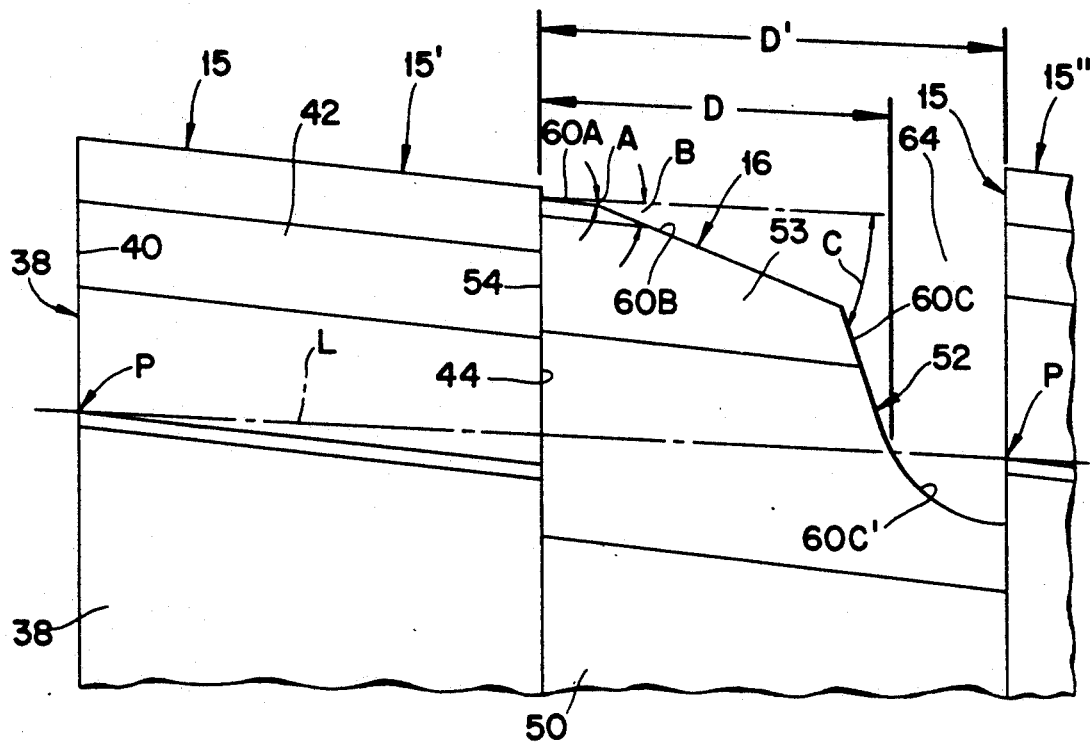
FIG. 6 is a fragmentary side elevational view of a leading and trailing broaching insert with a spacer disposed therebetween.

Each reinforcing spacer 16 is situated between an associated pair of leading and trailing broaching inserts 15', 15" (see FIG. 6). The reinforcing spacer includes a lower mounting portion 50 disposed in the cavity 14 and an upper reinforcing portion 52 projecting out of that cavity. The reinforcing portion 52 includes a reinforcing web 53 extending above a level L of the lowest point P of the cutting edge 40 of the associated leading broaching insert. Each reinforcing spacer and broaching insert includes a width dimension W (see FIG. 4) extending perpendicular to the longitudinal axis of the cavity 14. As is evident from FIG. 2, those width dimensions are substantially equal. The reinforcing web 53 includes a flat front surface 54 abutting the flat rear surface 44 of the leading broaching insert 15', and a pair of side surfaces 56. A top surface 60 of the reinforcing web 53 includes first, second, and third portions 60A, 60B, 60C which are inclined downwardly relative to the front-to-rear axis. The first portion 60A may be inclined by an angle A of about 5°, and the second portion 60B may be inclined by an angle B of about 20°. The third portion 60C is initially inclined at an angle C of about 70° and is then curved at 60C'. The curved portion 60C' extends below the level L of the lowest point P' of the cutting edge 38 of the associated trailing broaching insert 15". Thus, there is formed ahead of the trailing insert 15" a chip space 64 which extends vertically for the entire height of the cutting edge of that trailing broaching insert 15".

The web 53 extends rearwardly for a longitudinal distance D which is at least one-third and preferably at least one-half of the longitudinal spacing D' between the associated broaching inserts 15', 15". Furthermore, the front surface 54 of the reinforcing web 53 extends virtually the entire height of the rear surface 44 of the associated leading broaching insert 15'. Hence, the reinforcing web 53 provides ample reinforcement for the insert 15'.

Figure 5:
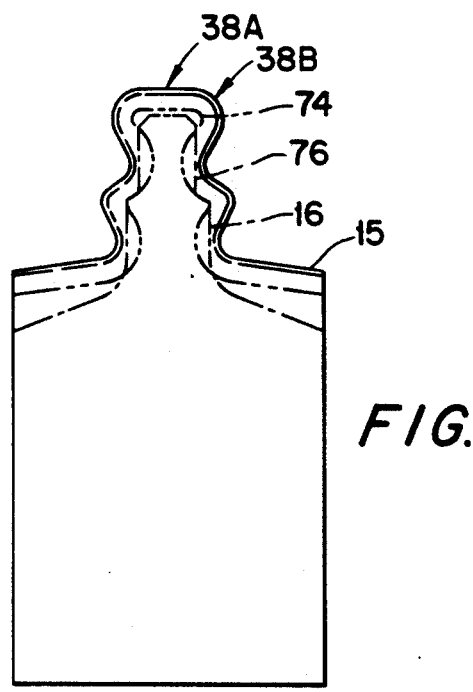
FIG. 5 is a front elevational view of a broaching insert and also depicting in phantom lines a front elevational profile of a spacer situated behind the broaching insert.

The relative cross-sectional size of the web 58 and the front and rear surfaces of a finishing-type broaching insert 15' is depicted in FIG. 5. The edge 38A represents the cutting edge of the largest or rearmost broaching insert; the edge 38B represents the cutting edge of the smallest or forwardmost broaching insert; 74 represents the edge of the rear surface 44 of each broaching insert; and 76 represents the edge of the front surface 54 of each reinforcing web 58. The cross section of the web front surface 54 is about the same as the rear surface 44 of the associated leading broaching insert. It will be appreciated from FIG. 5 that a maximum width of the reinforcing web 58 measured in a direction perpendicular to the longitudinal direction D (i.e., measured in a left-to-right direction in FIG. 5) is less than the maximum width of the cutting portions of the leading and trailing inserts. Also, the maximum height of the reinforcing web is less than the maximum height of the leading and trailing inserts.

The reinforcing web 58 is small enough to maximize the size of the chip space 64, while being sufficiently high and long to provide ample reinforcement for the associated leading broaching insert 15'.

The rear spacer bar 18 is also formed with a reinforcing web 28' which reinforces the rearwardmost broaching insert.

In practice, the broaching tool 10 and workpiece are moved relative to one another whereby the cutting portions 40 successively cut through the workpiece to form a slot therein. As this occurs, each cutting portion is reinforced from behind against thrust and bending loads by a respective reinforcing portion 52. Chips removed from the workpiece are received within the chip spaces formed between the broaching inserts and the respective reinforcing portions 52 spaced thereahead. Accordingly, jamming of the chips is avoided, thereby minimizing the chippage and breakage of the inserts which would otherwise occur. This extends the life of the inserts and reduces the frequency of their replacement.

The spacers can be of a universal size for use in all broaching tools, and no sharpening thereof is necessary.

The present invention has primary utility in connection with finishing-type broaching inserts, because cutting is performed along virtually the entire height of each side of the cutting portion (as compared with slotters which cut mainly at the ends of the cutting portions; and as compared with semi-finishers, which cut along only a section of the sides of the cutting portion). As a result, relatively large bending loads are imparted to the cutting portions of the finishing inserts, thus requiring the greatest reinforcement.

Although the present invention has been described in connection with a preferred embodiment of the invention, it will be appreciated by those skilled in the art that additions, modifications, substitutions, and deletions not specifically described may be made without departing from the spirit and scope of the invention as defined in the appended claims.

What is claimed is:

1. A broaching tool comprising:
   a holder forming therein a cavity which is elongated in a front-to-rear longitudinal direction;
   a plurality of broaching inserts arranged in longitudinally spaced relationship in said cavity, each broaching insert including a mounting portion removably disposed in said cavity and a cutting portion disposed above said cavity, the widths of said mounting portion being measured perpendicular to said longitudinal direction, said cutting portion including a front surface presenting a cutting edge; and
   a plurality of reinforcing spacers positioned between respective pairs of leading and trailing broaching inserts, each reinforcing spacer including a mounting portion removably disposed in said cavity and a reinforcing portion disposed above said cavity, said mounting portion of each reinforcing spacer engaging said mounting portions of said respective leading and trailing broaching inserts, the widths of said mounting portions of said reinforcing inserts being substantially the same as the widths of said mounting portions of said broaching inserts, said reinforcing portion including a reinforcing web extending above a lowermost level of said cutting edge of said respective leading broaching insert and abutting said rear surface thereof to provide said cutting portion with reinforcement against cutting forces,
   said rear surface of said leading cutting portion being longitudinally spaced from said front surface of said trailing insert by a longitudinal distance, and each of said cutting edges of said leading and trailing inserts including a lower end, said lower ends lying on an imaginary longitudinal line,
   said reinforcing web extending above said imaginary longitudinal line for at least one-third of said longitudinal distance from said rear surface to said front surface.

2. A broaching tool according to claim 1, wherein said reinforcing web extends upwardly to a level immediately adjacent an upper end of said rear surface of said respective leading broaching insert.

3. A broaching tool comprising:
   a holder forming therein a cavity which is elongated in a front-to-rear longitudinal direction;
   a plurality of broaching inserts arranged in said cavity, each broaching insert including a mounting portion removably disposed in said cavity and a cutting portion disposed above said cavity, said cutting portion including front and rear surfaces, said front surface presenting a cutting edge; and
   a plurality of reinforcing spacers alternating with said broaching inserts such that one of said reinforcing spacers is disposed between each successive pair of broaching inserts in said cavity, each reinforcing spacer including a mounting portion removably disposed in said cavity and a reinforcing portion disposed above said cavity, said mounting portion of each of said reinforcing spacers engaging said mounting portions of said respective pair of broaching inserts, said reinforcing portion including a reinforcing web extending above a lowermost level of said cutting edge of a leading broaching insert of its respective pair of broaching inserts and abutting said rear surface thereof to provide said cutting portion with reinforcement against cutting forces,
   said rear surface of said leading cutting portion being longitudinally spaced from said front surface of said trailing insert by a longitudinal distance, and each of said cutting edges of said leading and trailing inserts including a lower end, said lower ends lying on an imaginary longitudinal line,
   said reinforcing web extending above said imaginary longitudinal line for at least one-third of said longitudinal distance from said rear surface to said front surface.

4. A broaching tool according to claim 1, wherein a maximum width of said reinforcing web measured in a direction perpendicular to said longitudinal direction is less than a maximum width of said respective leading and trailing broaching inserts, and a maximum height of said reinforcing web being less than a maximum height of said respective leading and trailing broaching inserts.

5. A broaching tool according to claim 3, wherein said reinforcing spacers are formed of a tougher material than said broaching inserts.

6. A broaching tool according to claim 1, wherein said reinforcing web extends above said imaginary longitudinal line for at least one-half of said longitudinal distance from said rear surface to said front surface.

7. A broaching tool according to claim 4, wherein said reinforcing spacers are formed of a tougher material than a material of which said broaching inserts are formed.

8. A broaching tool according to claim 1, wherein said reinforcing spacers are formed of a tougher material than a material of which said broaching inserts are formed.

9. A broaching tool according to claim 8, wherein said broaching inserts and said reinforcing spacers are each formed of a hard material.

10. A broaching tool according to claim 9, wherein said hard material is tungsten carbide.

11. A broaching tool according to claim 1, wherein said broaching inserts constitute finishing inserts for forming slots in a workpiece.

12. A broaching tool for forming slots in a workpiece, comprising:
   a holder forming therein a longitudinally elongated cavity,
   a plurality of finishing-type broaching inserts arranged in longitudinally spaced relationship in said cavity, each insert including a mounting portion located in said cavity and a cutting portion disposed above said cavity, the widths of said mounting portions being measured perpendicular to said longitudinal direction, each insert including a front surface with a cutting edge, and a rear surface of smaller height and width than said front surface, and a plurality of reinforcing spacers formed of a tougher material than said inserts and positioned longitudinally between respective pairs of leading and trailing inserts, each reinforcing insert including a mounting portion located in said cavity, and a reinforcing portion disposed above said cavity, said mounting portion of each spacer engaging said mounting portions of said respective leading and trailing inserts, the widths of said mounting portions of said reinforcing inserts being substantially the same as the widths of said mounting portions of said broaching inserts, said reinforcing portion including a front surface abutting said rear surface of said respective leading insert, and a rear surface spaced forwardly of said front surface of said respective trailing insert to form a chip space therebetween, said front surface extending above a lowermost level of said cutting edge of said respective leading insert, said front surface being a smaller height and width than said front surface of said respective leading insert, said reinforcing spacers alternating with said broaching inserts such that one of said reinforcing spacers is disposed between each successive pair of finishing type broaching inserts, said rear surface of said leading cutting portion being longitudinally spaced from said front surface of said trailing insert by a longitudinal distance, and each of said cutting edges of said leading and trailing inserts including a lower end, said lower ends lying on an imaginary longitudinal line, said reinforcing web extending above said imaginary longitudinal line for at least one-third of said longitudinal distance from said rear surface to said front surface.

13. A broaching tool according to claim 12, wherein said reinforcing web extends above said imaginary longitudinal line for at least one-half of said longitudinal distance from said rear surface to said front surface.

14. A broaching tool according to claim 12, wherein said reinforcing portion has a maximum height and width less than a maximum height and width, respectively of said cutting portions of said inserts.

15. A broaching tool according to claim 1, wherein one of said broaching inserts is positioned between each successive pair of broaching inserts in said cavity.

* * * * *